US012363175B2

(12) United States Patent
Agrawal et al.

(10) Patent No.: US 12,363,175 B2
(45) Date of Patent: Jul. 15, 2025

(54) ADVERTISING BGP DESTINATION SECURE PATH REQUIREMENT IN GLOBAL INTERNET

(71) Applicant: Cisco Technology, Inc., San Jose, CA (US)

(72) Inventors: Swadesh Agrawal, Fremont, CA (US); Dhananjaya Kasargod Rao, Sunnyvale, CA (US); Jakob Heitz, Santa Clara, CA (US); Eric Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 807 days.

(21) Appl. No.: 17/406,321

(22) Filed: Aug. 19, 2021

(65) Prior Publication Data
US 2023/0054738 A1    Feb. 23, 2023

(51) Int. Cl.
*H04L 29/06*       (2006.01)
*H04L 9/32*        (2006.01)
(Continued)

(52) U.S. Cl.
CPC .......... *H04L 63/205* (2013.01); *H04L 9/3247* (2013.01); *H04L 9/3268* (2013.01);
(Continued)

(58) Field of Classification Search
None
See application file for complete search history.

(56) References Cited

U.S. PATENT DOCUMENTS

| 8,451,750 B2 * | 5/2013 | Ward ..................... H04L 45/04 370/254 |
| 9,641,430 B2 | 5/2017 | Gagliano et al. |

(Continued)

FOREIGN PATENT DOCUMENTS

| CN | 105376098 A | 3/2016 |
| CN | 106060014 B | 4/2019 |

OTHER PUBLICATIONS

Q. Li, M. Xu, J. Wu, X. Zhang, P. P. C. Lee and K. Xu, "Enhancing the Trust of Internet Routing With Lightweight Route Attestation," in IEEE Transactions on Information Forensics and Security, vol. 7, No. 2, pp. 691-703, Apr. 2012, doi: 10.1109/TIFS.2011.2177822. (Year: 2012).*

(Continued)

*Primary Examiner* — Jeffery L Williams
(74) *Attorney, Agent, or Firm* — Polsinelli P.C.

(57) ABSTRACT

Disclosed are systems, apparatuses, methods, and computer-readable media for secure network routing. A method includes: receiving, at a network node, an advertisement message for a network route including an IP address prefix; receiving, at the network node, a route origin authorization associated with the IP address prefix, the route origin authorization including a digital signature and a security requirement of a route to a destination that corresponds to the IP address prefix; determining, by the network node, one or more network nodes satisfies the security requirement to yield a determination; and determining, by the network node, to route network traffic to the IP address prefix based on the determination. In one example, the method can include, when the one or more network nodes satisfies the security requirement, advertising the route to the one or more network nodes that satisfies the security requirement.

17 Claims, 6 Drawing Sheets

(51) Int. Cl.
  *H04L 9/40* (2022.01)
  *H04L 45/00* (2022.01)
  *H04L 45/02* (2022.01)
  *H04L 45/74* (2022.01)

(52) U.S. Cl.
  CPC .............. *H04L 45/02* (2013.01); *H04L 45/54* (2013.01); *H04L 45/74* (2013.01); *H04L 63/10* (2013.01)

(56) References Cited

U.S. PATENT DOCUMENTS

| | | | |
|---|---|---|---|
| 9,722,919 | B2 | 8/2017 | Gagliano et al. |
| 9,804,891 | B1 | 10/2017 | Adalier |
| 9,806,982 | B2 * | 10/2017 | Carney .................. H04L 45/02 |
| 9,871,766 | B2 * | 1/2018 | Syed Mohamed .......................... H04L 63/0263 |
| 10,447,653 | B2 * | 10/2019 | Holtmanns ............. H04L 45/12 |
| 11,588,842 | B2 * | 2/2023 | Compton .............. H04L 41/145 |
| 11,799,756 | B2 * | 10/2023 | Wang ..................... H04L 45/02 |
| 2009/0019170 | A1 | 1/2009 | Ways et al. |
| 2009/0106449 | A1 * | 4/2009 | Satterlee ................ G06Q 30/02 709/238 |
| 2012/0167160 | A1 * | 6/2012 | Carney .................. H04L 45/02 726/1 |
| 2017/0353430 | A1 * | 12/2017 | Holtmanns ........... H04L 67/145 |
| 2020/0322264 | A1 * | 10/2020 | Clad ....................... H04L 45/34 |
| 2020/0322391 | A1 * | 10/2020 | Filsfils .................. H04L 63/205 |
| 2021/0158346 | A1 * | 5/2021 | Liu ....................... G06Q 20/223 |
| 2021/0160067 | A1 * | 5/2021 | Liu ....................... H04L 9/3239 |
| 2022/0103576 | A1 * | 3/2022 | Compton ............. H04L 41/0631 |
| 2022/0294729 | A1 * | 9/2022 | Clad ..................... H04L 45/306 |
| 2023/0054738 | A1 * | 2/2023 | Agrawal ............... H04L 9/3268 |
| 2023/0059348 | A1 * | 2/2023 | McBride ............... H04L 9/3297 |
| 2023/0155927 | A1 * | 5/2023 | Zhuang ................. H04L 63/12 370/389 |
| 2024/0137338 | A1 * | 4/2024 | Qu ........................ H04L 63/101 |

OTHER PUBLICATIONS

GlobalSign, "Certificate Authorities and Trust Hierarchies", May 2, 2115, Accessed via WebArchive, Jun. 1, 2024, www.globalsign.com/en/ssl-information-center/what-are-certification-authorities-trust-hierarchies/, p. 1-3. (Year: 2015).*

International Search Report and Written Opinion for PCT Application No. PCT/US2022/039230, dated Nov. 15, 2022, 10 pages.

* cited by examiner

| | | |
|---|---|---|
| 502 → | ASN | AS1212 |
| 504 → | Resources | 10.10.10/24 |
| 506 → | Secure Path | Yes |
| 508 → | Expiration | 2023:06:01:00:00:00 |
| 510 → | Certificates | 1xK8kj028GkjWIMnAo |

ADVERTISING BGP DESTINATION SECURE PATH REQUIREMENT IN GLOBAL INTERNET

DESCRIPTION OF THE RELATED TECHNOLOGY

An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A device that executes a BGP process is typically referred to as a BGP host or a BGP device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example route origin authorization (ROA) according to an example of the instant disclosure.

DETAILED DESCRIPTION

Figure 1:
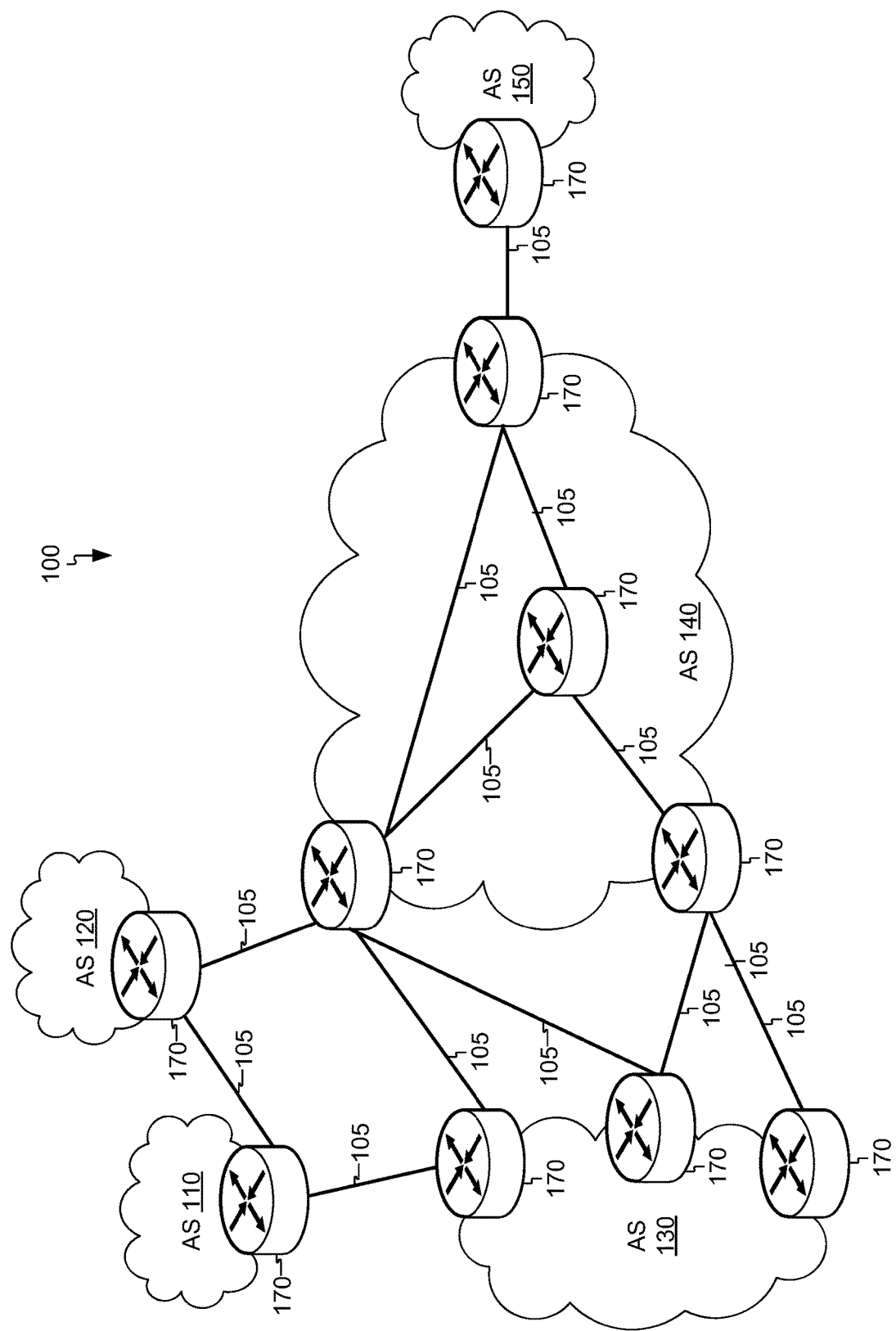
FIG. 1 illustrates an example communication network including one or more autonomous systems (ASes)

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Disclosed are systems, apparatuses, methods, and computer-readable media for secure network routing. According to at least one example, a method for providing secure network paths is disclosed. The method includes receiving, at a network node, an advertisement message for a network route including an IP address prefix; receiving, at the network node, a route origin authorization associated with the IP address prefix, the route origin authorization including a digital signature and a security requirement of a route to a destination that corresponds to the IP address prefix; determining, by the network node, whether one or more network nodes satisfies the security requirement to yield a determination; and determining, by the network node, whether to route network traffic to the IP address prefix based on the determination.

In another example, an apparatus for providing secure network paths is provided that includes a memory (e.g., configured to store data, such as virtual content data, one or more images, etc.), one or more processors (e.g., implemented in circuitry) coupled to the memory a transceiver (e.g., implemented in circuitry) coupled to the one or more processors. The one or more processors are configured to execute computer-readable instructions stored on the memory to receive an advertisement message for a network route including an IP address prefix, receive a route origin authorization associated with the IP address prefix, the route origin authorization including a digital signature and security requirement of a route to a destination that corresponds to the IP address prefix, determine whether one or more network nodes satisfies the security requirement to yield a determination, and determine whether to route network traffic to the IP address prefix based on the determination.

In another example, one or more non-transitory computer readable media comprising computer-readable instructions are provided that has stored thereon instructions that, when executed by one or more processors, cause the one or more processors at a network node to receive an advertisement message for a network route including an IP address prefix; receive a route origin authorization associated with the IP address prefix, the route origin authorization including a digital signature and security requirement of a route to a destination that corresponds to the IP address prefix; determine whether one or more network nodes satisfies the security requirement to yield a determination; and determine whether to route network traffic to the IP address prefix based on the determination.

In another example, an apparatus for providing secure network paths is provided. The apparatus includes means for receiving an advertisement of a route including an IP address prefix; means for requesting a route origin authorization associated with the IP address prefix; means for receiving the route origin authorization associated with the IP address prefix, the route origin authorization including a digital signature and a security requirement of a route to a destination that corresponds to the IP address prefix; means for determining whether one or more network nodes satisfies the security requirement; and means for determining whether to route network traffic to the IP address prefix based on the security requirement.

In some examples, one or more of the methods, apparatuses, and computer-readable medium described above further include storing network routes in a routing table corresponding to the one or more network nodes, wherein a network route to another network node that does not satisfy the security requirement for the IP address prefix is omitted from the routing table.

In some examples, one or more of the methods, apparatuses, and computer-readable medium described above further include receiving instruction indicating that a certificate associated with the digital signature is revoked; and updating the routing table to exclude routes to the IP address prefix.

In some examples, the advertisement of the route is included in a border gateway protocol update message.

In some examples, the digital signature is signed by an End Entity (EE) certificate of the route origin authorization.

In some examples, the EE certificate is generated using a certificate authority certificate.

In some examples, the one or more network nodes that satisfy the security requirement include a trusted platform module.

In some examples, one or more of the methods, apparatuses, and computer-readable medium described above further include determining whether to route network traffic to the IP address prefix by receiving network traffic to be relayed to the destination that corresponds to the IP address prefix and determining whether to route the network traffic based on the security requirement.

In some examples, one or more of the methods, apparatuses, and computer-readable medium described above further include receiving network traffic to be relayed to the destination; and determining a route to the destination that best corresponds to the security requirement.

In some examples, one or more of the methods, apparatuses, and computer-readable medium described above further include when the one or more network nodes satisfies the security requirement, advertising the route to the one or more network nodes that satisfies the security requirement.

In some examples, network nodes that do not satisfy the security requirement do not receive a route advertisement.

Example Embodiments

A network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected networks can prove burdensome, smaller groups of networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 6:
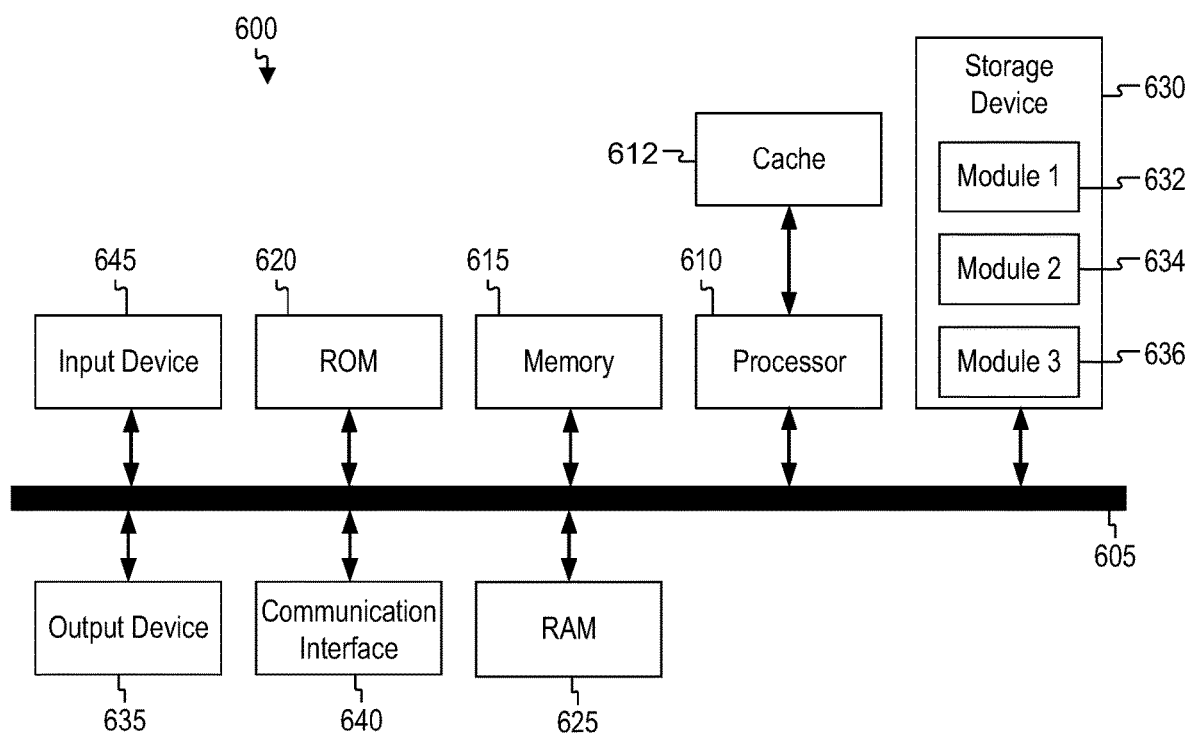
FIG. 6 illustrates an example of computing system, which can be for example any computing device that can implement components of the system.

FIG. 1 is a schematic block diagram of an example network 100 illustratively comprising nodes/devices (e.g., as depicted in FIG. 6) interconnected by various methods of communication. For instance, the example links 105 may be any suitable combination of wired links and shared media (e.g., wireless links, Internet Exchange Points, etc.) where certain nodes 170, such as, e.g., switches, routers, computers, etc., may be in communication with other nodes 170, e.g., based on distance, signal strength, current operational status, location, etc. Those skilled in the art will understand that any number of nodes, devices, links, etc. may be used in the network, and that the view shown herein is for simplicity.

Network traffic (e.g., data and/or messages sent between the devices/nodes) may be exchanged among the nodes/devices of the network 100 using predefined network communication protocols such as certain known wired protocols, as well as wireless protocols or other shared-media protocols where appropriate.

The network 100 includes a set of AS such as 110, AS 120, AS 130, AS 140 and AS 150. The network 100 may be positioned in any suitable network environment or communications architecture that operates to manage or otherwise direct information using any appropriate routing protocol or data management standard. For example, the network 100 may be provided in conjunction with a BGP.

As noted above, an AS may be a collection of connected Internet Protocol (IP) routing devices under the control of one or more network operators that presents a common, clearly defined routing policy to a network (e.g., the Internet). Usually, an AS comprises network devices, e.g., nodes/devices 170, that are established on the edge of the system, and that serve as the system's ingress and egress points for network traffic. Moreover, the devices 170 may be considered edge devices, border routers, or core devices within the respective AS. These network elements typically, but not always, are routers or any other element of network infrastructure suitable for switching or forwarding data packets according to a routing protocol or switching protocol. For the purposes of the present disclosure, the network elements located within an AS may alternatively be referred to as "forwarding devices" or "intermediate devices." Moreover, for illustration purposes, the AS 110, AS 120, AS 130, AS 140 and AS 150 are shown with a limited number of devices 170. In an actual implementation, however, an AS normally comprises numerous routers, switches, and other elements.

Each AS 110, AS 120, AS 130, AS 140 and AS 150 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the devices 170 within the ASes, the devices may exchange routing information to various network destinations. As described above, BGP is conventionally used to exchange routing and reachability information among network elements, e.g., devices 170, within a single AS or between different ASes. One particular example of BGP is BGPv4, as defined in Request for Comments (RFC) 4271 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (devices 170), or peers, first establish a transport protocol connection with one another. Initially, the BGP peers exchange messages to open a BGP session, and, after the BGP session is open, the BGP peers exchange their entire routing information. Thereafter, in some examples, only updates or changes to the routing information, e.g., the "BGP UPDATE" message, are exchanged, or advertised, between the BGP peers. The exchanged routing information is maintained by the BGP peers during the existence of the BGP session.

The BGP routing information may include the complete route to each network destination, e.g., "destination device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.0/16". The "/16" indicates that the first 16 bits are used to identify the unique network leaving the remaining bits in the address to identify the specific hosts within this network.

A path joining a plurality of ASes, e.g., links 105, may be referred to as an AS_PATH. The AS_PATH attribute indicates the list of ASes to be traversed to reach the address destination. For example, as illustrated in FIG. 1, the AS 130 may store an AS_PATH attribute of "150 140 120 110" where the address destination is the AS 150 (or a particular IP address within AS 150). In this example, the AS_PATH attribute indicates that the path to the address destination AS 150 from AS 130 sequentially passes through AS 110, AS 120 and AS 140, in that order.

Although it may be preferable that all devices 170 in the AS 110, AS 120, AS 130, AS 140 and AS 150 be configured according to BGP, in a real-world implementation, it may be unlikely that each device communicates using BGP. Thus, the disclosed embodiments are applicable to scenarios where all devices 170 in the network 100 are configured according to BGP, as well as scenarios where only a subset of the devices 170 is configured as such. Moreover, between any of the ASes, there may be a single communication path 105, e.g., between AS 110 and AS 130, as shown in FIG. 1, or there may be multiple communication paths 105, e.g., between AS 130 and AS 140. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) is a distributed database of certified Route Origin Authorizations (ROA) for originating AS validation to prevent route leaks and hijacks. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS_PATH attribute of BGP update messages so that a BGP speaker can assess the validity of the AS_PATH in update messages that it receives.

A secure network path allows sensitive internet traffic to bypass network elements which are not fully trusted that have the ability to inadvertently or maliciously tamper with the network data. For instance, a banking entity may require that network elements that relay the network traffic cannot manipulate the network traffic to ensure the integrity of the data within that network traffic. However, there is no current mechanism to advertise sensitive subnets in the internet that require a particular level of security. While BGP interdomain routing is used to advertise destinations across the internet, BGP attributes can be tampered with or dropped. Therefore, BGP alone cannot identify a secure network path for network traffic. Another potential is to attach the requirement in a BGPSEC_PATH attribute of RFC 8205, but the BGPSEC_PATH attribute could be maliciously or inadvertently dropped to remove any potential security features, and therefore cannot guarantee a secure network path for the network traffic.

To allow a network to identify network devices that provide a secure path, the instant disclosure advertises sensitive subnets or destinations in the internet to ensure that network traffic is routed through trusted systems. In some examples, the existing RPKI can be extended to signal sensitive subnets/destinations to different network nodes in an AS. In some examples, RPKI can be extended to provide additional security mechanisms to facilitate identification of a secure route through a network. For instance, as will be described further below, a network router can receive an ROA from the RPKI that includes a security requirement, which requires network traffic destined toward that subnet to route the network traffic through secure network nodes. The ROA may also include a digital signature that authenticates the validity of the security requirement.

In one implementation, an End Entity (EE) (e.g., the owner) of an IP address prefix (e.g., 10.10.10/24) advertises that traffic to that IP address prefix should be secure by issuing an ROA for storage in an RPKI. The advertisement includes a digital signature that is signed by an EE certificate that verifies the data included in the ROA, which includes the security requirement, is authentic. When a route advertisement is received by a network node, the network node will retrieve a corresponding ROA from the RPKI based on the IP address prefix. When the destination of the IP address corresponds to the EE that has a security requirement, the RPKI will transmit that security requirement to the network node requesting the ROA.

For example, an owner (e.g., EE) of an IP address range may receive a certificate from a CA that indicates it owns the range of IP addresses (e.g., an IP address prefix). The EE may use the certificate to signing an ROA. When the EE generates an ROA, the ROA includes a security requirement for network traffic directed to its IP addresses and includes a digital signature that was signed by the EE certificate. The RPKI receives the ROA and updates its tables to advertise the route to the EE based on the security requirement.

Figure 2:
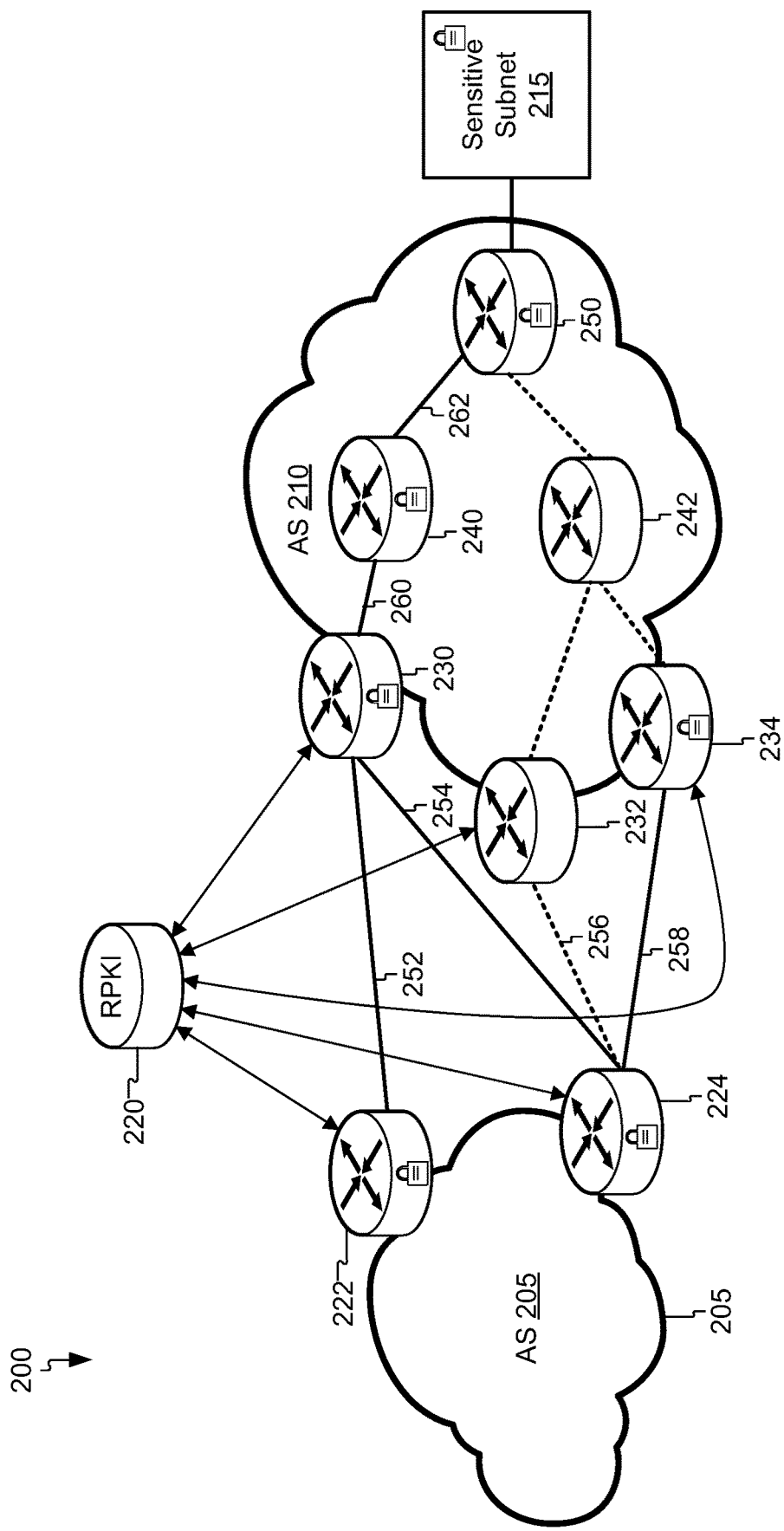
FIG. 2 illustrates an example network that is capable of securely routing traffic according to an example of the instant disclosure.

FIG. 2 illustrates an example network 200 that is capable of securely routing traffic. In this example, a first AS 205 is transmitting network data to a sensitive subnet 215 via a second AS 210, and an RPKI 220 will issue ROAs to edge switches of the first AS 205 and the second AS 210. Initially, a first edge switch 222 of the first AS 205 and a second edge switch 224 of the first AS 205 both receive a BGP update message based on a potential route to the sensitive subnet 215. Both the first edge switch 222 and the second edge switch 224 have sufficient security, which is indicated by the padlock symbol throughout this disclosure, and the sensitive subnet 215 requires that network traffic be secured. The first edge switch 222 and the second edge switch 224 may request an ROA from the RPKI 220. In response, the RPKI 220 transmits the ROA to both the first edge switch 222 and the second edge switch 224, and the ROA includes a security requirement that requires network traffic to the sensitive subnet 215 to be transmitted over a secure path. Both the first edge switch 222 and the second edge switch 224 validate the digital signature in the ROA to authenticate that the source of security requirement is the EE of the sensitive subnet 215.

The second AS 210 includes a first edge switch 230 that has sufficient security, a second edge switch 232 that does have sufficient security, and a third edge switch 234 that has sufficient security. The second AS 210 also includes a first intradomain switch 240 and a second intradomain switch 242 that routes intradomain traffic toward the sensitive subnet. The first intradomain switch 240 and the fourth edge switch 250 both have sufficient level of security, and the second intradomain switch 242 does not have sufficient level of security. For example, sufficient security can be identified based various software and hardware analyses such as identification of authentic hardware, authentic firmware, boot integrity verification, file system verification, omission of content in a denial list, verification of a unique identity, etc. The relying party may identify exactly what levels must be met before a peering relationship or a connection is permitted.

In some examples, the first edge switch 222 is connected to first edge switch 230 and can determine that link 252 is secure and can be a viable path towards the sensitive subnet 215. When the first edge switch 222 determines that the link 252 is secure, the first edge switch 222 can advertise the route to the first edge switch 230 via a BGP update message.

The second edge switch 224 is also connected to first edge switch 230 and can determine that link 254 is secure based on security information (e.g., has a sufficient level of security) and can be a viable path towards the sensitive subnet 215. The second edge switch 224 is also connected to the second edge switch 232 but determines that link 256 cannot be used because the second edge switch 232 does not have the sufficient level of security. In FIG. 2, a dashed line between the switches indicates an insecure path based on security information associated with a neighboring network node. In some examples, the second edge switch 224 can determine that the link 258 is secure because the third edge switch 234 has the sufficient level of security.

At the second AS 210, the first edge switch 230 and third edge switch 234 can receive the BPM updates and request an ROA from the RPKI 220. The first edge switch 230 and the third edge switch 234 are aware of the intradomain devices (e.g., intradomain switch 240, intradomain switch 242, and switch 250) and can provide routes to the sensitive subnet 215 based on their network topology and the security requirements. In FIG. 2, the first edge switch 230 can determine that the intradomain router 240 has sufficient security and can relay network traffic via the link 260. Similarly, the intradomain router 240 can determine that the switch 250 has sufficient security and network traffic can be relayed via link 262.

On the other hand, the second edge switch 232 does not receive a routing advertisement because it does not have sufficient security and there is potentially no link to the sensitive subnet 215, which is illustrated as dashed lines in FIG. 2 for convenience. The third edge switch 234 determines that the second intradomain switch 242 does not provide the sufficient level of security and, as such, no route between the third edge switch 234 to the sensitive subnet 215 can be identified. Therefore, both the second edge switch 232 and the third edge switch 234 is unable to route traffic to the sensitive subnet 215 based on the security requirement.

Thus, network nodes that do not satisfy a security requirement that is required by the EE do not receive a route advertisement and cannot form a route to the sensitive subnet 215. Nodes that receive a route advertisement retrieve the ROA and validate the digital signature to verify that the route requires security and then attempt to identify potential routes to the sensitive subnet 215 based on the security requirement.

In some examples, various network nodes (e.g., first edge switch 222, second edge switch 224, first edge switch 230, second edge switch 232, third edge switch 234, intradomain switch 240, intradomain switch 242, switch 250, etc.) can include a TPM module that securely stores security level information. The TPM securely stores artifacts (e.g., passwords, certificates, encryption keys, platform measurements, etc.) that are used to provide secure authentication (e.g., ensuring that the platform can prove that it is what it claims to be) and attestation (e.g., proving that a platform is trustworthy and has not been breached). In some examples, when a device boots up, the device can identify different security features of the network device (e.g., file system level security, hardware level security, image security etc.) and generate security information to be stored in the TPM. A verifier device ensures that information in the TPM is secured. As an example, a verifier device can be a separate device that analyzes hashes of the software identities loaded from firmware, hashes of loaded operating system files, specific log information, to generate a numeric score or numeric scores (e.g., a numeric score for each analysis). In some examples, the verifier device may advertise the security information of the network device to other nodes (e.g., network nodes) at a scheduled time (e.g., weekly) or based upon an event (e.g., boot up).

Figure 3:
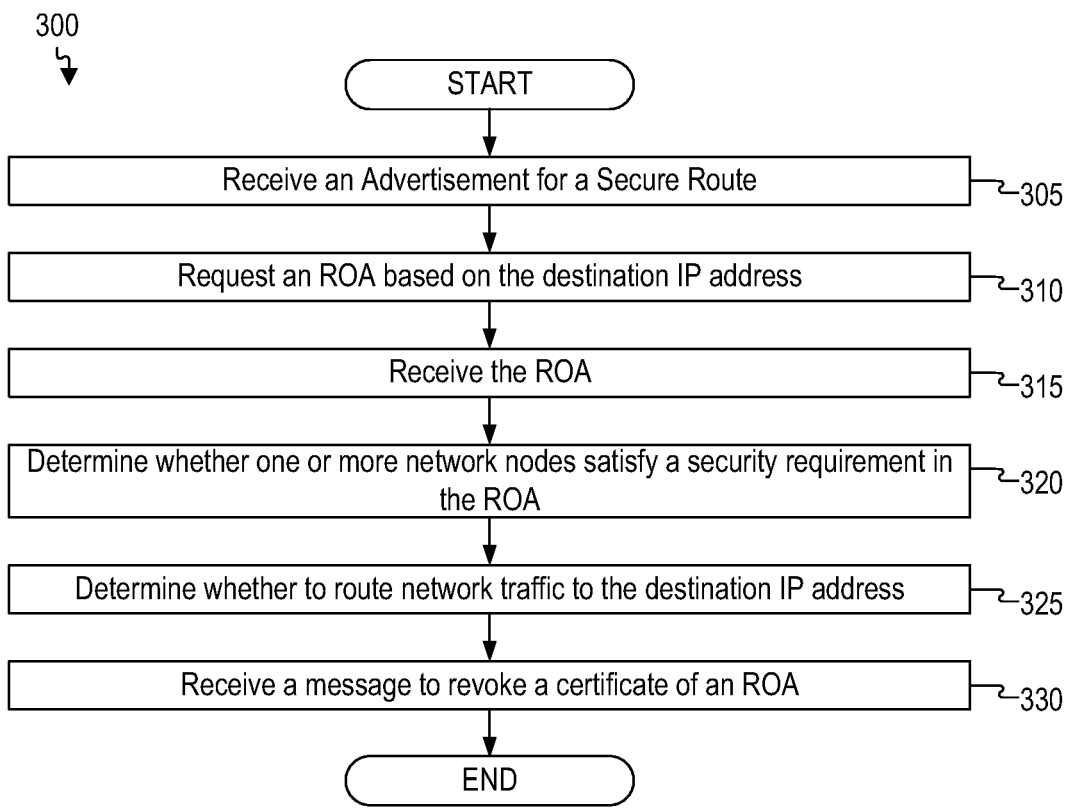
FIG. 3 is a flowchart of a method for selectively advertising routes based on security information according to an example of the instant disclosure.

FIG. 3 illustrates an example method 300 of a network device that advertises a secure network path requirement as described above in FIG. 2. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, a network device (e.g., a switch, a router, etc.) that executes method 300 receives an advertisement of a route including an IP address prefix at block 305. In some examples, the advertisement of the route is included in a BGP update message. For example, another network node may be advertising routes to a sensitive subnet and the processor 610 illustrated in FIG. 6 may receive a BGP update message that includes an IP address prefix that corresponds to the sensitive subnet.

According to some examples, the network device may request an ROA associated with the IP address prefix at block 310. For example, after receiving the BGP update message, the processor 610 illustrated in FIG. 6 may request an ROA associated with the IP address prefix from the RPKI.

According to some examples, the network device may receive the ROA associated with the IP address prefix from the RPKI at block 315. For example, after requesting the ROA at block 315, the processor 610 illustrated in FIG. 6 may receive the ROA associated with the IP address prefix. The ROA may include a security requirement of a route to a destination that corresponds to the IP address prefix and a digital signature that authenticates the authenticity of the security requirement. As described in further detail below with reference to FIG. 5, the ROA may include a secure path requirement (e.g., a Boolean flag) or secure path information (e.g., an integer value) that can be authenticated.

According to some examples, the network device may determine whether one or more network nodes satisfies the security requirement at block 320. As noted above, a verifier device may monitor a TPM of a network node to determine that the information is secured in the TPM and may transmit security information of the network node to neighboring devices. In this example, the processor 610 illustrated in FIG. 6 may search for a routing table for neighboring network nodes and determine whether one or more neighboring network nodes that satisfies the security requirement based on the security information (e.g., which can be received from the verifier device) that corresponds to the respective neighbor network node.

After determining whether one or more network nodes satisfies the security requirement, the network device 300 may determine whether to route network traffic to the IP address prefix based on the security requirement at block 325. The various examples of block 320 can be executed by a different mechanisms that are described below.

In one example of determining whether to route network traffic at block 325, the network device, when the one or more network nodes satisfies the security requirement, may advertise the route to the one or more network nodes that satisfies the security requirement. For example, the processor 610 illustrated in FIG. 6 may, when the one or more network nodes satisfies the security requirement, advertise the route to the one or more network nodes that satisfies the security requirement. When a route is not advertised to a particular network node, a route to that particular network node is not stored in the corresponding routing table, thereby precluding any network traffic destined to a sensitive subnet from reaching that particular network node.

In the event that the network node is allowed to route traffic to one or more neighbor network nodes that satisfy the security requirement, the network node stores a route (e.g., a flow) in a routing table for each neighbor network node that satisfies the security requirement. If no neighbor network node satisfies the security requirement, the network node may not store a corresponding route in its routing table. In this example, the determination of whether to route the network traffic occurs before any actual network traffic is received.

In another example of determining whether to route network traffic at block 325, the network device may receive network traffic to be relayed to the destination that corresponds to the IP address prefix. In this example, the network device may determine whether to route the network traffic when that network traffic is received. For example, the processor 610 illustrated in FIG. 6 may receive network traffic to be relayed to the destination that corresponds to the IP address prefix. In some examples, the network device that receives the network traffic may have advertised routes to neighboring network nodes and makes a decision on how to route the network traffic based on security information provided by different network nodes.

According to some examples, the network device may receive an instruction to revoke a certificate associated with an ROA at block 330. In some examples, after the route is stored in the network node, the requirement for the secure path to the sensitive subnet may be revoked and unsecure routes can be reinstated. For instance, the EE may revoke a certificate to revise the security requirement of the route. In this instance, the EE may revoke the original route and issue a revised route with an updated security requirement. In that case, the network device may have two ROAs that are both applicable to the same IP address and the same time and may contain different security requirements.

Figure 4:
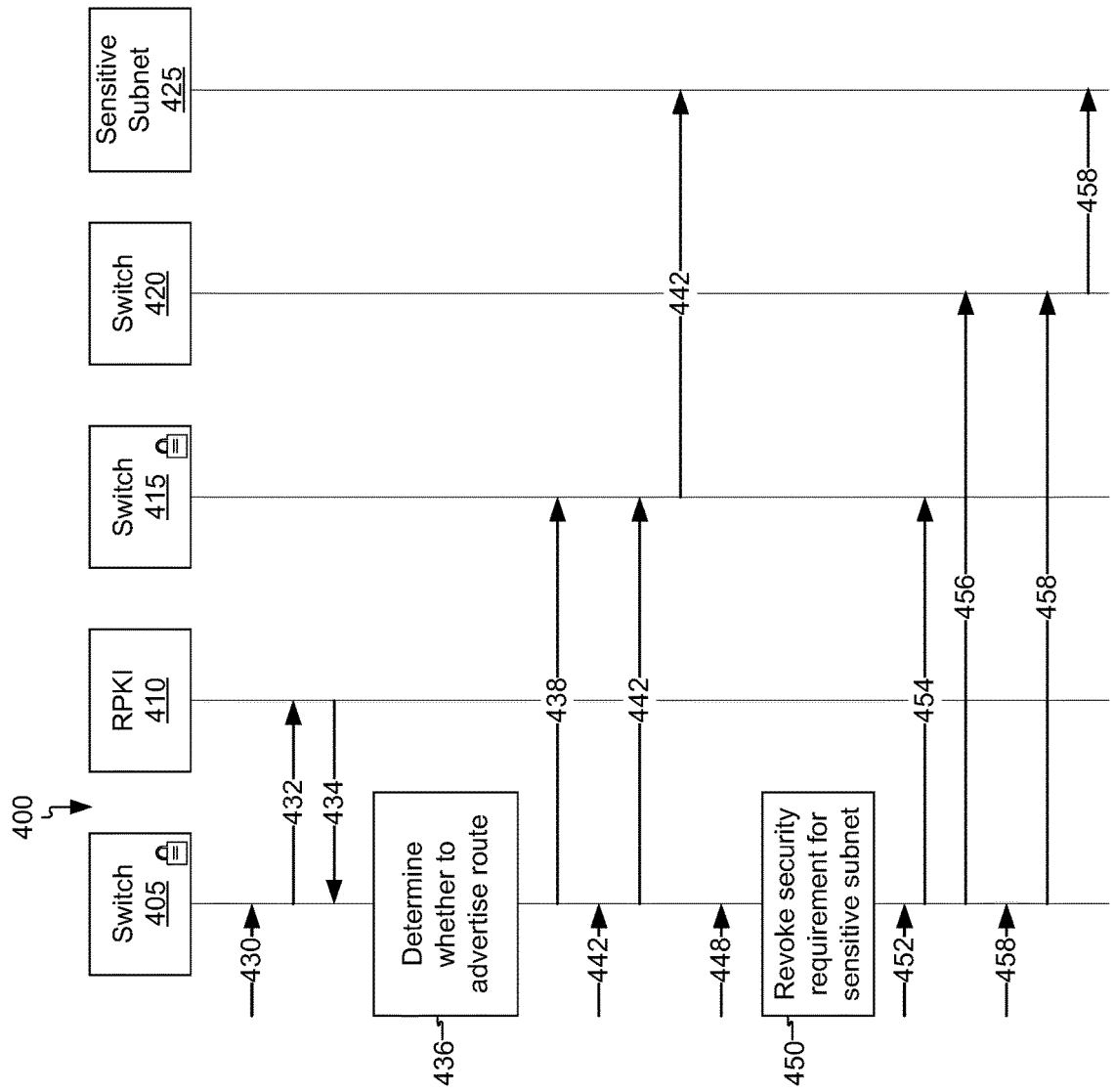
FIG. 4 illustrates a sequence diagram for selectively advertising routes based on security information according to an example of the instant disclosure.

FIG. 4 illustrates a sequence diagram of a switch advertising routes based on a security requirement according to an example of the instant disclosure. As will be described, a switch 405 may request a ROA from the RPKI, and the switch may advertise a route based on the ROA to a switch 415 and switch 420 to transmit data to a sensitive subnet 425. In some examples, as indicated by the padlock symbol, the switch 405 and the switch 415 are determined to have sufficient security, but the switch 420 is determined to not have sufficient security. As noted above, security information can be stored in a TPM module of a network device and transmitted to neighboring nodes.

Initially, the switch 405 may receive a message 430 (e.g., a BGP update message) that advertises a route to a destination IP address within the sensitive subnet 425. Accordingly, the switch 405 may transmit a ROA request 432 to the RPKI 410, which identifies and transmits an ROA 434 to the switch 405.

At block 436, the switch 405 analyzes the ROA 434 to determine whether the IP address prefix is within the sensitive subnet 425 and network traffic to the sensitive subnet 425 must satisfy a security requirement. For instance, the security requirement may require that network traffic be routed through switches having security features to prevent tampering with the network data. The switch 405 also determines whether to advertise the route to neighboring switches based on whether the switches have sufficient level of security (e.g., based on security information provided to the switch 405).

In this example, the switch 405 ascertains that the switch 415 satisfies the sufficient requirement for the route to the sensitive subnet 425, but switch 420 cannot satisfy the security requirement for the route to the sensitive subnet 425. Accordingly, the switch 405 transmits a message 438 to the switch 415 advertising the route to the sensitive subnet 425, but does not transmit a corresponding message to the switch 420 advertising the route to the sensitive subnet 425. In some examples, the switch 415 may record the route to the switch 415 in a routing table, but does not record the route to the switch 420 because network traffic directed through switch 420 does not meet the security requirement. In some examples, the switch 405 may record the route when advertising the route, or may record the route when the switch 415 responds to the advertisement. For example, after the switch 415 determines it can route the traffic to the sensitive subnet 425 based on other intervening network nodes, which are not illustrated, the switch 415 responds to the routing advertisement in ROA request 432 to indicate that a path exists that satisfies the security requirement, thereby causing the switch 405 to record the route in its routing table.

After recording the route, when network traffic is subsequently received to the sensitive subnet 425, the switch 405 can forward traffic based on a network flow in its routing table. For instance, when the switch 405 receives network traffic 442 that is destined towards an IP address within the sensitive subnet 425, the switch 405 may determine where to forward the traffic based on its routing table. As described above, a route to the sensitive subnet 425 is provided via the switch 415 and the sensitive subnet 425 relays the network traffic 442 to the switch 415, which further relays the network traffic 442 to the sensitive subnet 425.

As noted above, the EE certificate that signs the ROA may be revoked for various reasons (e.g., an EE sub-divides its IP addresses and assigns the IP address to another EE, the certificate expires, the EE revokes the certificate due for security reasons, the CA issues a new CA certificate). To that end, it is desired that only the routes associated with that particular EE can be revoked without affecting other routes. Accordingly, a revocation message 448 may be received by the switch 405 and the switch 405 may revoke routes that correspond to the security requirement.

In some examples, the switch 405 may delete all routes corresponding to the sensitive subnet 425 in the routing table at block 450. In this implementation, the switch 405 may then advertise a route associated with the sensitive subnet 425 or may wait for an advertisement for a route to the sensitive subnet 425. For purposes of illustration, a route advertisement 452 is received by the switch 405 that does not include a security requirement, and the switch 405 transmits a route advertisement 454 to the switch 415 and a route advertisement 456 to the switch 420.

Accordingly, the switch 405 will now transmits network traffic 458 to the sensitive subnet 425 without consideration of any security requirement. As illustrated in FIG. 4, the switch 405 may relay the network traffic 458 to the sensitive subnet 425 through the switch 420.

Thus, as illustrated in FIG. 4, a route can be secured through an AS based on an ROA that allows the switch 405 to advertise potential routes based on a security requirement. As discussed above, the security requirement can be a Boolean flag requiring that each network node include a TPM. However, the security requirement can be any suitable value that can be used to facilitate identifying a score to identify a route. For instance, the switches may be located in particular countries, and the country can affect the score based on regulations, legislation, and other requirements. The security score can also be affected by hardware and software features as noted above.

FIG. 5 illustrates an example ROA according to an example of the instant disclosure. As illustrated in FIG. 5, the ROA includes an ASN 502 that identifies the destination AS, resources 504 that identify an IP address prefix of a corresponding EE, and a secure path Boolean flag 506 that identifies whether the network traffic should be relayed through trusted nodes (e.g., switches having a sufficient security level). The secure path Boolean flag 506 is one example. However, the security requirement can be any suitable value that can be used to facilitate identifying a score to identify a route, as described above.

The ROA 500 may also include an expiration timestamp 508 (e.g., Jun. 1, 2023 at 00:00:00 hours) that indicates when the certificate that signed the ROA expires. The ROA 500 may also include at least one digitally signed certificate 510 that is encrypted using a suitable signature from the EE or at least one certificate. As noted above, a network node that receives the ROA 500 uses the digitally signed certificate 510 to validate that the ROA 500 is authentic. For instance, a network node can use a public key to decode the certificate 510. Failure to decode the digitally signed certificate 510 indicates that the ROA 500 is inauthentic (e.g., maliciously or inadvertently altered).

FIG. 6 shows an example of computing system 600, which can be for example any computing device making up network nodes 170, first edge switch 222, second edge switch 224, first edge switch 230, second edge switch 232, third edge switch 234, first intermediate switch 240, second intermediate switch 242, fourth edge switch 250, RPKI 220, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances the present technology may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method of a network node, the method comprising: receiving an advertisement of a route including an IP address prefix; requesting a route origin authorization associated with the IP address prefix; receiving the route origin authorization associated with the IP address prefix, the route origin authorization including a digital signature and a security requirement of a route to a destination that corresponds to the IP address prefix; determining one or more network nodes satisfies the security requirement; and determining to route network traffic to the IP address prefix based on the security requirement.

Aspect 2. The method of Aspect 1, further comprising: storing network routes in a routing table corresponding to the one or more network nodes, wherein a network route to another network node that does not satisfy the security requirement for the IP address prefix is omitted from the routing table.

Aspect 3. The method of any of Aspects 1 to 2, further comprising: receiving in instruction indicating that a certificate associated with the digital signature is revoked; and updating the routing table to include routes to the IP address prefix that do not satisfy the security requirement.

Aspect 4. The method of any of Aspects 1 to 3, further comprising: validating that a source of the advertisement of the route is authorized to advertise the IP address prefix.

Aspect 5. The method of any of Aspects 1 to 4, wherein the advertisement of the route is included in a border gateway protocol (BGP) update message.

Aspect 6. The method of any of Aspects 1 to 5, wherein the digital signature is signed by an End Entity (EE) certificate of the route origin authorization.

Aspect 7. The method of any of Aspects 1 to 6, wherein the EE certificate is generated from a certificate authority (CA) certificate.

Aspect 8. The method of any of Aspects 1 to 7, wherein the one or more network nodes that satisfy the security requirement include a trusted platform module.

Aspect 9. The method of any of Aspects 1 to 8, wherein determining whether to the route network traffic to the IP address prefix: receiving network traffic to be relayed to the destination that corresponds to the IP address prefix; determining to route the network traffic based on the security requirement.

Aspect 10. The method of any of Aspects 1 to 9, wherein determining whether to the route network traffic to the IP address prefix comprises: receiving network traffic to be relayed to the destination; determining a route to the destination that best corresponds to the security requirement.

Aspect 11. The method of any of Aspects 1 to 10, wherein determining whether to the route network traffic to the IP address prefix comprises: when the one or more network nodes satisfies the security requirement, advertising the route to the one or more network nodes that satisfies the security requirement.

Aspect 12. The method of any of Aspects 1 to 11, wherein network nodes that do not satisfy the security requirement do not receive a route advertisement.

Aspect 13: A network device for routing network traffic includes a transceiver (e.g., a network interface, a wireless transceiver, etc.) and a processor coupled to the transceiver. The processor configured to execute instructions and cause the processor to: receive an advertisement of a route including an IP address prefix; request a route origin authorization associated with the IP address prefix; receive the route origin authorization associated with the IP address prefix, the route origin authorization including a digital signature and a security requirement of a route to a destination that corresponds to the IP address prefix; determine one or more network nodes satisfies the security requirement; and determine to route network traffic to the IP address prefix based on the security requirement.

Aspect 14: The network device of Aspect 13, wherein the processor is configured to execute the instructions and cause the processor to: store network routes in a routing table corresponding to the one or more network nodes, wherein a network route to another network node that does not satisfy the security requirement for the IP address prefix is omitted from the routing table.

Aspect 15: The network device of any of Aspects 13 to 14, wherein receiving in instruction indicating that a certificate associated with the digital signature is revoked; and update the routing table to include routes to the IP address prefix that do not satisfy the security requirement.

Aspect 16: The network device of any of Aspects 13 to 15, wherein the processor is configured to execute the instructions and cause the processor to: validate that a source of the advertisement of the route is authorized to advertise the IP address prefix.

Aspect 17: The network device of any of Aspects 13 to 16, wherein the advertisement of the route is included in a border gateway protocol (BGP) update message.

Aspect 18: The network device of any of Aspects 13 to 17, wherein the digital signature is signed by an End Entity (EE) certificate of the route origin authorization.

Aspect 19: The network device of any of Aspects 13 to 18, wherein the EE certificate is generated from a certificate authority (CA) certificate.

Aspect 20: The network device of any of Aspects 13 to 19, wherein the one or more network nodes that satisfy the security requirement include a trusted platform module.

Aspect 21: The network device of any of Aspects 13 to 20, wherein determining whether to the route network traffic to the IP address prefix: receive network traffic to be relayed to the destination that corresponds to the IP address prefix; determine to route the network traffic based on the security requirement.

Aspect 22: The network device of any of Aspects 13 to 21, wherein the processor is configured to execute the instructions and cause the processor to: receive network traffic to be relayed to the destination; determine a route to the destination that best corresponds to the security requirement.

Aspect 23: The network device of any of Aspects 13 to 22, wherein the processor is configured to execute the instructions and cause the processor to: when the one or more network nodes satisfies the security requirement, advertise the route to the one or more network nodes that satisfies the security requirement.

Aspect 24: The network device of any of Aspects 13 to 23, wherein network nodes that do not satisfy the security requirement do not receive a route advertisement.

Aspect 25: A computer readable medium comprising instructions using a computer system. The computer includes a memory (e.g., implemented in circuitry) and a processor (or multiple processors) coupled to the memory. The processor (or processors) is configured to execute the computer readable medium and cause the processor to: receive an advertisement of a route including an IP address prefix; request a route origin authorization associated with the IP address prefix; receive the route origin authorization associated with the IP address prefix, the route origin authorization including a digital signature and a security requirement of a route to a destination that corresponds to the IP address prefix; determine one or more network nodes satisfies the security requirement; and determine to route network traffic to the IP address prefix based on the security requirement.

Aspect 26: The computer readable medium of Aspect 25, wherein the processor is configured to execute the computer readable medium and cause the processor to: store network routes in a routing table corresponding to the one or more network nodes, wherein a network route to another network node that does not satisfy the security requirement for the IP address prefix is omitted from the routing table.

Aspect 27: The computer readable medium of any of Aspects 25 to 26, wherein receiving in instruction indicating that a certificate associated with the digital signature is revoked; and update the routing table to include routes to the IP address prefix that do not satisfy the security requirement.

Aspect 28: The computer readable medium of any of Aspects 25 to 27, wherein the processor is configured to execute the computer readable medium and cause the processor to: validate that a source of the advertisement of the route is authorized to advertise the IP address prefix.

Aspect 29: The computer readable medium of any of Aspects 25 to 28, wherein the advertisement of the route is included in a border gateway protocol (BGP) update message.

Aspect 30: The computer readable medium of any of Aspects 25 to 29, wherein the digital signature is signed by an End Entity (EE) certificate of the route origin authorization.

Aspect 31: The computer readable medium of any of Aspects 25 to 30, wherein the EE certificate is generated from a certificate authority (CA) certificate.

Aspect 32: The computer readable medium of any of Aspects 25 to 31, wherein the one or more network nodes that satisfy the security requirement include a trusted platform module.

Aspect 33: The computer readable medium of any of Aspects 25 to 32, wherein determining whether to the route network traffic to the IP address prefix: receive network traffic to be relayed to the destination that corresponds to the IP address prefix; determine to route the network traffic based on the security requirement.

Aspect 34: The computer readable medium of any of Aspects 25 to 33, wherein the processor is configured to execute the computer readable medium and cause the processor to: receive network traffic to be relayed to the destination; determine a route to the destination that best corresponds to the security requirement.

Aspect 35: The computer readable medium of any of Aspects 25 to 34, wherein the processor is configured to execute the computer readable medium and cause the processor to: when the one or more network nodes satisfies the security requirement, advertise the route to the one or more network nodes that satisfies the security requirement.

Aspect 36: The computer readable medium of any of Aspects 25 to 35, wherein network nodes that do not satisfy the security requirement do not receive a route advertisement.

What is claimed is:

1. A method comprising:
    receiving, at a network node, an advertisement message for a network route including an IP address prefix;
    receiving, at the network node, a route origin authorization associated with the IP address prefix, the route origin authorization including a digital signature and a security requirement of a route to a destination that corresponds to the IP address prefix, wherein the security requirement is a score that dictates determination of the route based on factors including one or more of geographical regions, hardware features, and software features network nodes present in the route;
    utilizing, by the network node, the security requirement to determine the route by determining one or more additional network nodes that satisfy the security requirement to yield a determination, wherein the determination is made by analyzing a Trusted Platform Module (TPM) of each of the one or more additional network nodes; and
    routing, by the network node, the network traffic to the IP address prefix using the route.

2. The method of claim 1, further comprising:
    storing network routes in a routing table corresponding to the one or more network nodes, wherein a network route to another network node that does not satisfy the security requirement for the IP address prefix is omitted from the routing table.

3. The method of claim 2, further comprising:
    receiving an instruction indicating that a certificate associated with the digital signature is revoked; and
    updating the routing table exclude routes to the IP address prefix.

4. The method of claim 1, wherein the advertisement of the route is included in a border gateway protocol (BGP) update message.

5. The method of claim 1, wherein the digital signature is generated using an End Entity (EE) certificate of the route origin authorization.

6. The method of claim 5, wherein the EE certificate is generated using a certificate authority (CA) certificate.

7. The method of claim 1, wherein determining whether to route network traffic to the IP address prefix, comprises:
    receiving the network traffic to be relayed to the destination that corresponds to the IP address prefix;
    routing the network traffic based on the security requirement.

8. The method of claim 1, wherein routing the network traffic to the IP address prefix comprises:
    when the one or more network nodes satisfies the security requirement, advertising the route to the one or more network nodes that satisfies the security requirement.

9. A network device for routing network traffic, comprising:
    a transceiver; and
    one or more processors coupled to the transceiver, the one or more processors being configured to execute computer-readable instructions stored on one or more associated memories to:
        receive an advertisement message for a network route including an IP address prefix,
        receive a route origin authorization associated with the IP address prefix, the route origin authorization including a digital signature and security requirement of a route to a destination that corresponds to the IP address prefix, wherein the security requirement is a score that dictates determination of the route based on factors including one or more of geographical regions, hardware features, and software features network nodes present in the route,
        utilize the security requirement to determine the route by determining one or more network nodes that satisfy the security requirement to yield a determination, wherein the determination is made by analyzing a Trusted Platform Module (TPM) of each of the one or more network nodes, and
        route network traffic to the IP address prefix using the route.

10. The network device of claim 9, wherein the one or more processors are configured to execute the computer-readable instructions to:
    store network routes in a routing table corresponding to the one or more network nodes, wherein a network route to another network node that does not satisfy the security requirement for the IP address prefix is omitted from the routing table.

11. The network device of claim 10, wherein the one or more processors are configured to execute the computer-readable instructions to:
    receive an instruction indicating that a certificate associated with the digital signature is revoked; and
    update the routing table to exclude routes to the IP address prefix.

12. The network device of claim 9, the digital signature is signed by an End Entity (EE) certificate of the route origin authorization.

13. The network device of claim 12, the EE certificate is generated using a certificate authority certificate.

14. The network device of claim 9, wherein the one or more processors are further configured to execute the computer-readable instructions to:
    receive the network traffic to be relayed to the destination that corresponds to the IP address prefix; and
    route the network traffic based on the security requirement.

15. The network device of claim 9, wherein the one or more processors are further configured to execute the computer-readable instructions to:

when the one or more network nodes satisfies the security requirement, advertise the route to the one or more network nodes that satisfies the security requirement.

16. One or more non-transitory computer-readable media comprising computer-readable instructions, which when executed by a one or more processors at a network node, cause the network node to:

receive an advertisement message for a network route including an IP address prefix;

receive a route origin authorization associated with the IP address prefix, the route origin authorization including a digital signature and security requirement of a route to a destination that corresponds to the IP address prefix, wherein the security requirement is a score that dictates determination of the route based on factors including one or more of geographical regions, hardware features, and software features network nodes present in the route;

utilize the security requirement to determine the route by determining one or more network nodes that satisfy the security requirement to yield a determination, wherein the determination is made by analyzing a Trusted Platform Module (TPM) of each of the one or more network nodes, and route network traffic to the IP address prefix using the route.

17. The one or more non-transitory computer-readable media of claim 16, wherein execution of the computer-readable instructions further cause the network node to:

store network routes in a routing table corresponding to the one or more network nodes, wherein a network route to another network node that does not satisfy the security requirement for the IP address prefix is omitted from the routing table.

* * * * *